UNITED STATES PATENT OFFICE.

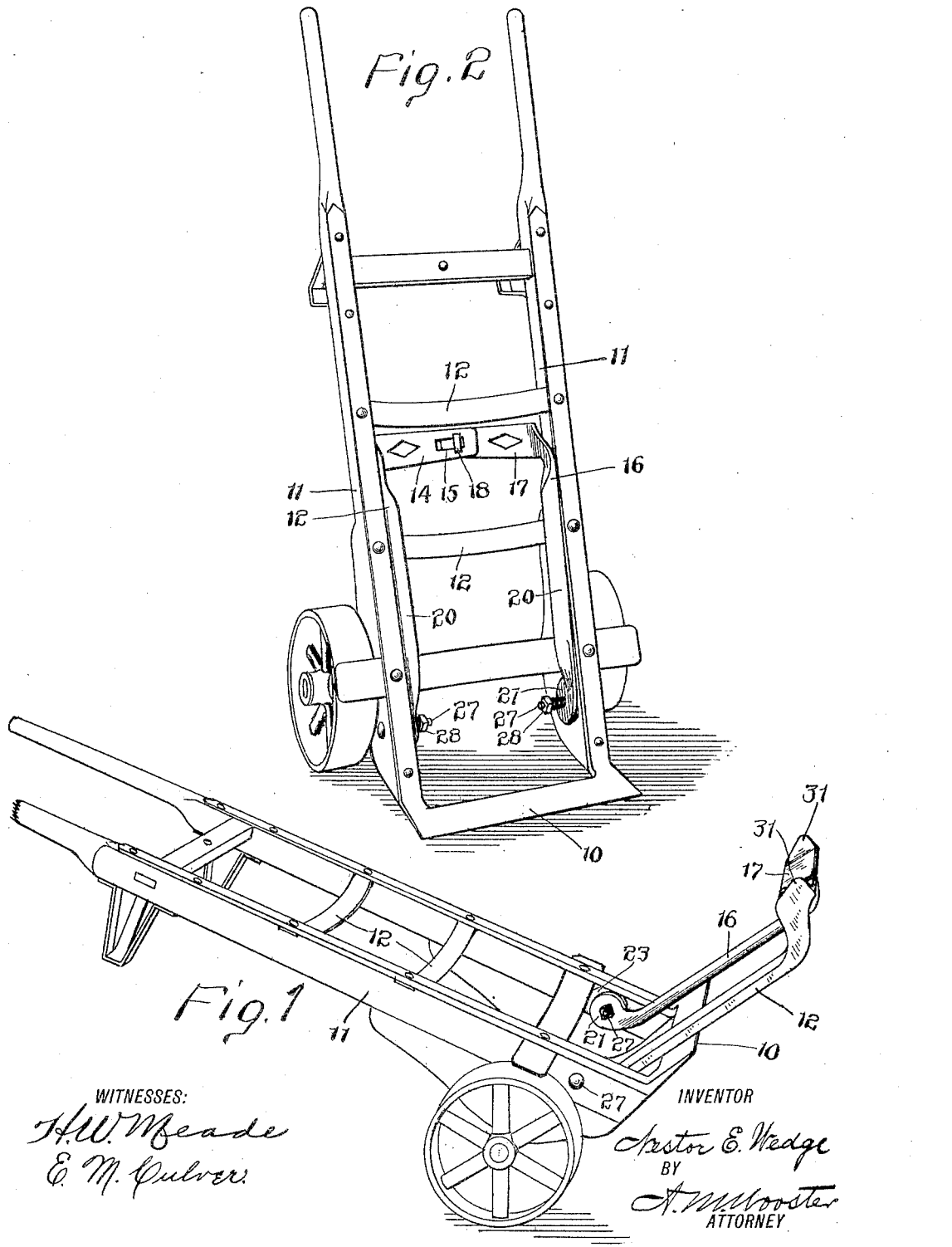

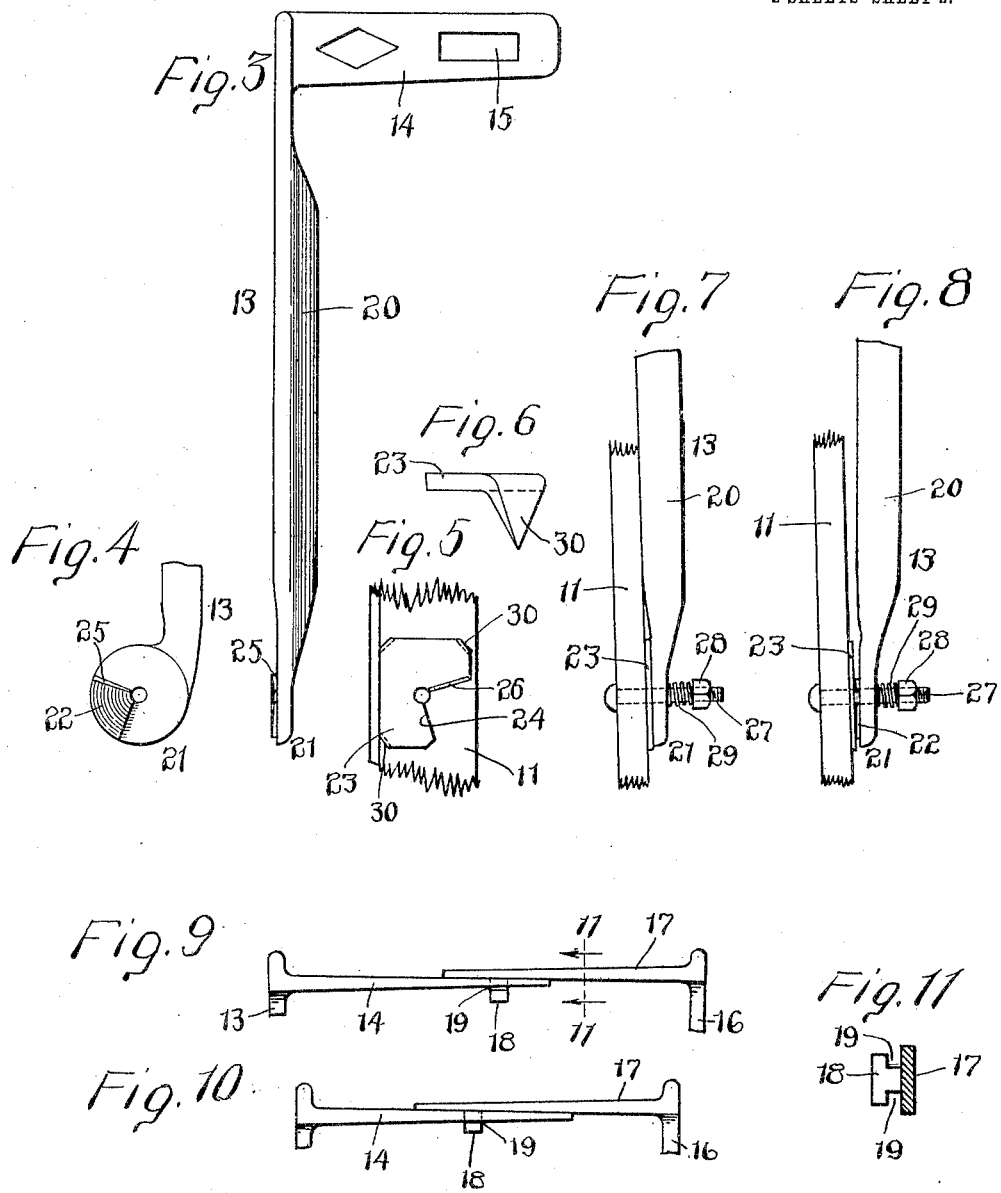

NESTOR E. WEDGE, OF LONG HILL, CONNECTICUT.

FOLDING RACK FOR HAND-TRUCKS.

1,099,584.  Specification of Letters Patent.  Patented June 9, 1914.

Application filed February 4, 1914. Serial No. 816,508.

*To all whom it may concern:*

Be it known that I, NESTOR E. WEDGE, a citizen of the United States, residing at Long Hill, county of Fairfield, State of Connecticut, have invented an Improvement in Folding Racks for Hand-Trucks, of which the following is a specification.

This invention has for its object to provide a folding two-part rack for hand trucks that may be readily attached to trucks already in use, may be easily thrown into or out of operative position, will be self-locking when out of operative position and which will be wholly out of the way when not in use and will not interfere to the slightest extent with the ordinary use of the truck.

With these and other objects in view I have devised the novel structure, which I will now describe, referring to the accompanying drawings forming a part of this specification and using reference characters to indicate the several parts.

Figure 1 is a perspective of a truck with my novel rack applied thereto and in operative position; Fig. 2 a perspective showing the rack in the folded position, as when the truck is in ordinary use; Fig. 3 an enlarged elevation of the left arm of the rack (as seen in Fig. 2) detached; Fig. 4 a view of the lower end of said arm, as seen from the left in Fig. 3; Fig. 5 a detail view of the inner face of one of the side bars of a truck showing the locking plate in place thereon; Fig. 6 a detail view on a still larger scale illustrating a means for attaching the locking plate to the side bar; Fig. 7 a detail elevation showing the left arm of the rack in locking engagement with the corresponding side bar of a truck; Fig. 8 a similar view showing the action of the locking projection on the rack arm in connection with the locking plate on the side bar, after the projection has been disengaged from the recess in the plate and the swinging movement of the rack toward the operative position has commenced; Fig. 9 an end view of the rack with the arms in the position they assume when locked out of operative position, as in Fig. 2; Fig. 10 a similar view with the arms in the operative position, as in Fig. 1, and Fig. 11 is a section on the line 11—11 in Fig. 9, looking in the direction of the arrows.

10 denotes the bill, 11 the side bars and 12 the cross bars of a hand truck which may be of the ordinary or any preferred design so far as my present invention is concerned, it being understood of course, that as this type of trucks is ordinarily constructed, the side bars diverge more or less from the bill toward the handles, a slight divergence being shown in the drawings.

In order to insure that the rack will lie in close engagement with the side bars of the truck when the rack is not in use, so as not to interfere to the slightest extent with the ordinary use of the truck, and at the same time the rack will be perfectly rigid and free from a tendency to rattle, I make the rack to consist of two parts or arms which are constructed and connected together in the manner I will now describe.

13 denotes the left arm which is provided with an inwardly extending angle arm 14 having near its inner end an elongated slot 15, and 16 denotes the right arm which is provided with an inwardly extending angle arm 17 having on its under-side a catch comprising a head 18 with slots 19 under the head on opposite sides thereof. The angle arms are made tapering in thickness from the arms toward their inner ends, which overlap. The head and slot are interengaging and it is of course immaterial which arm is provided with the head and which with the slot. In assembling, the head is turned longitudinally to the slot and passed through it and then the angle arm carrying the head is turned into substantial alinement with the other angle arm, the head lying transversely to the slot and the portions of the other arm outside longitudinal slot 15 lying in the slots 19 under the head.

In the inoperative position of the rack, as in Figs. 2 and 9, the outer ends of the arms are moved apart to cause them to lie closely in engagement with the diverging side bars of the truck, the angle arm which is provided with the longitudinal slot 15 lying loosely in the slots 19 under the head of the other angle arm. In the operative position of the rack, as in Figs. 1 and 10, the outer ends of the arms are forced inward and the taper of the angle arms causes one arm to wedge in the slots 19 under the head of the other arm, as will be more fully explained.

In order to strengthen the arms, they are each provided on their inner sides with enlargements 20 which are beveled downward and inward so as not to interfere with the use of a truck in carrying a barrel or cask.

The outer ends of the arms, at the intersection therewith of the angle arms, are shown as provided with projections 31 which act to retain long articles from slipping off. At the inner ends of the arms are heads 21 each provided with a locking projection 22 shown as made V-shaped which is highest at its outer edge and is inclined toward the center.

Upon the inner side of each side bar is a locking plate 23 having a recess 24 which just receives the corresponding locking projection. One edge of the locking projection and one edge of the locking recess, either or both, may be beveled as at 25 and 26 respectively in order to facilitate the passage of the projection out of the recess in swinging the rack from the inoperative to the operative position. The arms are pivoted to the side bars by bolts 27 which pass through the side bars, the locking plates and the arms and extend inward beyond the arms. Each bolt carries a nut 28 and a spring 29 bearing against the nut and the corresponding arm to retain the arm closely in engagement with the locking plate and side bar, as clearly shown in Fig. 7. I have shown the locking plates as secured in place by means of lugs 30 formed integral therewith, which are driven into the wood of the side bars and securely retain the plates in place without the use of nails or screws.

In order to attach my novel rack to a truck already in use it is simply necessary to bore one hole only in each side bar to receive a pivot bolt.

The operation is as follows: It has already been explained that the side bars of trucks ordinarily diverge more or less, and that it is essential for satisfactory results that the arms of the rack lie close to the side bars of the truck in the inoperative position. When the rack is lying in the inoperative position as in Fig. 2, a push with the hand or foot throws it out from the position shown and it is easily swung down to the operative position as in Fig. 1. The locking projections ride out from the recesses in the locking plates and the bevels on the locking projections through their engagement with the locking plates swing the arms inward substantially parallel with each other in which position they lie against the bill in use. This cam action of the bevels on the locking plates causes the angle arms to move inward, as shown in Fig. 10, and, by means of the taper in thickness of the angle arms, causes one of said arms to wedge in the slots under the head on the other arm, so as to prevent rattling in use and make the rack perfectly rigid as if made in a single piece. When the rack is swung downward into inoperative position again, the locking projections drop into the recesses again and through the action of the springs the angle arms are caused to move outward relatively to each other as in Figs. 2 and 9 and the arms are thrown into close engagement with the side bars of the truck and retained wholly out of the way.

Having thus described my invention I claim:

1. The combination with the side bars of a truck, of a two-part rack, a sliding connection at the outer ends of the parts, pivots at the inner ends thereof and springs acting against the parts to retain them in engagement with the side bars in the inoperative position.

2. The combination with the side bars of a truck, of a rack pivoted thereto and comprising arms having overlapping angle arms at their outer ends, a sliding connection between said angle arms, and springs at the inner ends of the arms whereby in the inoperative position the arms are caused to lie closely in engagement with the side bars.

3. The combination with the side bars of a truck, of a two-part rack pivoted to the side bars, overlapping angle arms at the outer ends of the arms, a catch and slot connection for the angle arms and springs acting against the arms, for the purpose set forth.

4. The combination with diverging side bars of a truck, of a two-part rack pivoted to the side bars and having overlapping angle arms, a sliding connection for said angle arms and springs at their inner ends acting to retain the arms in close engagement with the diverging side bars when in the inoperative position.

5. The combination with the side bars of a truck, of a two-part rack pivoted thereto and angle arms at the outer ends of the parts which taper inward in thickness, one of said angle arms having a slot and the other angle arm a catch with a head and slots under the head which receive the slotted arm, so that the arms wedge when forced inward.

6. The combination with the side bars of a truck of a two-part rack pivoted thereto, said parts having a sliding connection at their outer end and heads at their inner ends, said side bars having plates with locking recesses and the heads upon the parts of the rack having locking projections adapted to engage said recesses in the inoperative position and to ride on the locking plates in the operative position, for the purpose set forth.

7. The combination with the side bars of a truck provided with locking plates having recesses, of rack members pivoted to the side bars and having heads provided with locking projections adapted to engage the recesses and springs acting on the heads of the members.

8. The combination with the side bars of a truck, and locking plates on said bars having V-shaped recesses, of rack members pivoted to the side bars and having a sliding connection at their outer ends and heads at their inner ends provided with V-shaped locking projections highest at their outer edges and inclined toward the center, and springs bearing against the heads whereby when the rack members are swung to the operative position they are caused to move inward toward each other.

9. The combination with the side bars of a truck, and locking plates secured thereto and provided with recesses, of swinging rack members having heads at their inner ends provided with locking projections adapted to engage the recesses, bolts passing through the side bars and the locking plates and springs carried by said bolts and acting against the heads.

In testimony whereof I affix my signature in presence of two witnesses.

NESTOR E. WEDGE.

Witnesses:
MARIE L. HAGGEMAN,
DENNIS F. COLLINS.

---

Copies of this patent may be obtained for five cents each, by addressing the "Commissioner of Patents, Washington, D. C."